(12) United States Patent
Wai (10) Patent No.: US 7,145,442 B1
(45) Date of Patent: Dec. 5, 2006

(54) VEHICLE OPERATION DISPLAY SYSTEM

(76) Inventor: Yu Hei Sunny Wai, 2282 Hastings Dr., Belmont, CA (US) 94002

( * ) Notice: Subject to any disclaimer, the term of this patent is extended or adjusted under 35 U.S.C. 154(b) by 127 days.

(21) Appl. No.: 10/684,031

(22) Filed: Oct. 14, 2003

(51) Int. Cl.
*B60Q 1/00* (2006.01)

(52) U.S. Cl. .................. 340/438; 340/440; 340/441; 340/453; 340/461; 340/815.4

(58) Field of Classification Search ........ 340/459–462, 340/438, 440, 441, 453, 815.4, 815.45, 815.44, 340/815.53, 691.1, 691.6, 521, 522, 691.3; 701/29–35; 345/33, 35–40
See application file for complete search history.

(56) References Cited

U.S. PATENT DOCUMENTS

| | | | |
|---|---|---|---|
| 4,594,572 A * | 6/1986 | Haubner et al. ............. 340/461 |
| 5,555,502 A * | 9/1996 | Opel ........................... 701/36 |
| 5,825,284 A * | 10/1998 | Dunwoody et al. ......... 340/461 |
| 5,880,710 A * | 3/1999 | Jaberi et al. ................. 340/461 |
| 5,949,330 A * | 9/1999 | Hoffman et al. ............. 340/461 |
| 5,949,345 A * | 9/1999 | Beckert et al. .............. 340/461 |
| 6,398,688 B1 | 6/2002 | Brown et al. ................ 475/204 |
| 6,493,623 B1 | 12/2002 | Nishida et al. ............... 701/89 |
| 6,497,301 B1 | 12/2002 | Iida et al. .................... 180/249 |
| 6,603,393 B1 | 8/2003 | Sumada et al. ............. 340/461 |
| 6,721,634 B1 * | 4/2004 | Hauler et al. ................ 340/441 |

* cited by examiner

*Primary Examiner*—Thomas Mullen (57) ABSTRACT

An apparatus, method, system and/or image editing process for presenting visual displays to the driver of a motor vehicle regarding the real time operating condition of the vehicle systems and components. These include the anti-lock braking system, the stability of the vehicle as to proximity to rolling over, the power consumed by vehicle components such as the heating system and lights and/or, for four-wheel drive vehicles, the torque and/or braking forces delivered to the wheels. The information is acquired from sensors and/or from signals generated by the vehicle and it processed by the vehicle CPU or, in another embodiment, by a display CPU, the information being presented in black and white or in color using an LED, LCD, vacuum fluorescent means, numerical display, gauge, meter or PDA.

44 Claims, 10 Drawing Sheets

Vehicle Operation Display System

Yu Hei Sunny Wai

Vehicle Operation Display System

Yu Hei Sunny Wai

VEHICLE OPERATION DISPLAY SYSTEM

FIELD OF INVENTION

This invention relates generally to the field of information acquisition and display devices on a real-time basis and more particularly to systems which monitor the operation of powered vehicles and which display the status or condition of various aspects of vehicle operation for the driver. The invention specifically relates to the display of systems involving the anti-lock braking system, the stability of the vehicle as to proximity to rolling over, the power consumed by vehicle components such as the heating system and lights and/or, for four-wheel drive vehicles, the torque and/or braking forces delivered to the wheels. The information is acquired from sensors and/or from signals generated by the vehicle and is processed by the vehicle CPU or, in another embodiment by a display CPU. The processed information is then displayed for the driver in black and white or in color using an LED, LCD, vacuum fluorescent means, numerical display, gauge or meter.

BACKGROUND OF THE INVENTION

No prior art can be found which discloses the present invention. Historically the status of drive train components, of anti-locking brake system components, power usage by vehicle components, and/or of the approach of a rollover condition have not been displayed for the driver by any type of vehicle.

U.S. Pat. No. 6,398,688, by Brown, et al, however discloses a visual display in FIG. 1 but without elaboration in the specification.

U.S. Pat. No. 6,497,301 by Iida, et al, discloses an indicator 25 and alarming lamp and alarm 26 in FIG. 1 without further elaboration in the specification. Regarding the same type of disclosure, reference is made to U.S. Pat. No. 6,493,623 Nishida, et al.

U.S. Pat. No. 46,603,393 by Sumada, et al, discloses a display for a vehicle operator for functional status of the vehicle but only mentions an open hood latch. No mention is made of the dynamics of operation of the vehicle.

U.S. Pat. No. 5,825,284, Dunwoody et al, discloses a system and method of calculating the approach of a rollover condition for a vehicle. The method described uses a "lateral load transfer" sensor to calculate the center of gravity which is an inoperable means to make this calculation. Restated, very low weight loadings on a vehicle can be configured which will give high lateral loading and which result in no turning moment whatever. The Dunwoody patent is completely inoperable. The present invention uses a harmonic frequency sensor which provides the means to calculate the center of gravity of a vehicle with great accuracy. With this and the input from a lateral acceleration sensor, the approach to a rollover condition of a vehicle is calculated with great accuracy.

U.S. Pat. No. 5,949,330, Hoffman et al, discloses a general monitoring and diagnosing means without reference to monitoring vehicle parameters and without reference to the approach of a rollover condition of a vehicle.

U.S. Pat. No. 6,721,634, Hauler, et al, discloses the use of a "freely programmable instrument cluster" within a vehicle but does not recite any vehicle parameters which are to be monitored and displayed. No reference is made regard monitoring vehicle parameters which would indicate the approach of a rollover condition of a vehicle.

U.S. Pat. No. 5,555,502, Opel, discloses a control system and an associated method with feedback input by the driver of a vehicle but does not recite any vehicle parameters which are to be monitored and displayed. No reference is made regard monitoring vehicle parameters which would indicate the approach of a rollover condition of a vehicle.

U.S. Pat. No. 5,880,710, Jabei, et al, utilizes a filtering and selection means for information but does not recite any vehicle parameters which are to be monitored and displayed. No reference is made regard monitoring vehicle parameters which would indicate the approach of a rollover condition of a vehicle.

U.S. Pat. No. 4,594,572, Haubner, et al, discloses a complex display means and primarily addresses the processing of information. The sole example given of a condition to be monitored is that of an open trunk compartment. Otherwise it does not recite any vehicle parameters which are to be monitored and displayed. No reference is made regarding the monitoring of vehicle parameters which would indicate the approach of a rollover condition of a vehicle.

U.S. Pat. No. 5,949,345, Berkert, et al, discloses a system based upon a computer program without the utilization of a dedicated display. The sole vehicle parameter mentioned which is to be monitored is the fuel gauge. Torque related information, as delivered to the wheels and the approach to a rollover condition by a vehicle are not mentioned.

The present invention discloses the use of a dynamic or real time display of the relative amounts of torque being transferred to the axles of a four-wheel drive vehicle and the use of an accurate monitoring means to indicate the approach of a rollover condition of a vehicle. These types of displays are currently unavailable to vehicle operators. No patents, including those cited above, disclose the method, system, process or apparatus of the present invention.

SUMMARY OF THE INVENTION

The present invention is an apparatus, method, process and system for displaying real-time operational information about a motor vehicle to the driver. The invention specifically relates to the display of the status of systems involving the anti-lock braking system, the stability of the vehicle as to the approach of a rollover condition, the power consumed by vehicle components such as the heating system and lights and the torque and/or braking forces delivered to the wheels. The information is acquired from sensors and/or from signals generated by the vehicle and is processed by the vehicle CPU or, in another embodiment, by a display CPU. The processed information is then displayed for the driver in black and white or in color using an LED, LCD, vacuum fluorescent means, numerical display, gauge or meter.

The preferred images used in said display to convey said operating parameters are meaningful, symbolic, easily understood and spare in style. The presentation is in either black and white or color and the variety of types of display devices enumerated all generally serve to adequately display the needed information. Audible signals and/or warnings are used to augment these visual presentations. The preferred displays are time-variant, concise and appropriate for the information presented and include a proportional symbolic display, bar charts, a segmented bar chart, variable-size or variable-shape icon or images.

It is an object of the present invention to provide an improved display means and system for the display of vehicle operating parameters to an operator of a motor vehicle.

It is another object of the present invention to display information regarding the distribution of torque or driving forces at the wheels of a vehicle to the operator of the vehicle.

It is another object of the present invention to display information to the operator regarding the approach of a rollover condition of the vehicle.

It is another object of the present invention to collection information for display to an operator regarding the driving forces at the wheels of a vehicle by using a flux sensor or Hall effect sensor.

It is another object of the present invention to display to the operator of a vehicle, information regarding the usage of power by various power consuming components of the vehicle.

As disclosed by the present invention, the following items are new, useful applications of existing technologies for the display of information regarding the performance of a vehicle to the operator of the vehicle:

(1) the torque or driving forces being delivered to the wheels;

(2) the slippage of one or more wheels relative to the other wheels, particularly for four wheel drive vehicles;

(3) the accurate visual display of the approach of a rollover condition of the vehicle;

(4) the power being used by the power consuming components of a vehicle;

(5) the use of true audible warnings for the approach of a rollover condition of a vehicle.

These applications are not obvious as the required technologies are old and the need for these applications has been long standing. Until the present invention, they have been unavailable.

These and other objects an advantages of the present invention will become clear to those skilled in the art in view of the description of the best presently known mode of carrying out the invention and the applicability of the preferred embodiment as described herein and as illustrated in the several figures of the drawings.

| Numeral | Reference Numerals - Description |
|---|---|
| | Description |
| 1. | Left front tire |
| 2. | Right front tire |
| 3. | Left rear tire |
| 4. | Right rear tire |
| 5. | Front transfer case |
| 6. | Rear transfer case |
| 7. | Front axle |
| 8. | Rear axle |
| 9. | Front-rear transfer shaft |
| 10. | Braking indicator line |
| 11. | General reference number for a display |
| 12. | Upper display bar |
| 13. | Lower display bar |
| 14. | Power source |
| 15. | In-gear braking indicator |
| 16. | Highlighted item |
| 17. | Band, moving traction indicator |
| 18. | Vehicle outline |
| 19. | Harmonic frequency sensor |
| 20. | High temperature tape |
| 21. | Arc indicator |
| 22. | Wheel steering angle sensor |
| 23. | Wheel steering angle sensor connector |
| 24. | Electromagnetic clutch |
| 25. | Winch symbol |
| 26. | In-line connector |
| 27. | Toroidal coil sensor |
| 28. | Master brake cylinder and controller |
| 29. | Brake |
| 30. | Display device, mounted |
| 31. | Brake line |
| 32. | CPU, vehicle |
| 33. | Power takeoff symbol |
| 34. | Electromagnetic clutch controller |
| 35. | Flux sensor |
| 36. | CPU, display system |
| 37. | Accelerometer or gravity direction sensor |
| 38. | Bar chart amplitude |
| 39. | CPU connector |
| 40. | Negative bar chart amplitude |
| 41. | Bar chart, left front wheel |

-continued

| Numeral | Description |
| --- | --- |
| 42. | Bar chart, right front wheel |
| 43. | Bar chart, left rear wheel |
| 44. | Bar chart, right rear wheel |
| 45. | Wheel speed sensor |
| 46. | Wheel speed connector |
| 47. | Connector, vehicle CPU |
| 48. | ABS controller |
| 49. | Bar chart |
| 50. | Connector to vehicle CPU |
| 51. | Connector to display CPU |
| 52. | Scalar bar diagram |
| 53. | Indicator bar |
| 54. | Clamping induction coil |
| 55. | Sound amplitude indication symbol |
| 56. | Bar chart divider |
| 57. | Analog to digital (A/D) converter |
| 58. | Wheel load sensor |
| 59. | Direction arrow |
| 60. | Vehicle lighting symbol |
| 61. | Net acceleration vector |
| 62. | Center of gravity of vehicle |
| 63. | — |
| 64. | Ground |
| 65. | Stereo system (speaker) symbol |
| 66. | Air conditioning system symbol |
| 67. | Cruise control symbol |
| 68. | Heating system symbol |
| 69. | Bar chart |
| 70. | Power sensor |
| 71. | Numerical display |
| 72. | Scalar module |
| 73. | Vector angle |
| 74. | Radial line |
| 75. | Vehicle display panel |
| 76. | Reference image data module |
| 77. | General reference number for a variable image |
| 78. | Bar chart in pie segment format |
| 79. | Device formating module |
| 80. | Numerical display |
| 81. | Image generation module |
| 82. | — |
| 83. | In-line series current sensor |
| 84. | Alarm speaker |
| 85. | Alarm speaker connector |

DESCRIPTION OF THE PREFERRED EMBODIMENT OF THE INVENTION

The best known method for the presentation of graphical information to the driver of a motor vehicle regarding specific real-time operating parameters of the vehicle using display devices is the present invention. These specific real-time operating parameters are defined as the operation of an anti-lock braking system (ABS) and/or the behavior of the vehicle as to stability, that is, to the approach of a rollover condition and/or operation of a vehicle as to the power consumed by vehicle components and/or, for four-wheel or all-wheel drive vehicles, operation of the vehicle as to the torque and/or braking forces delivered to the wheels (which are not limited to these factors).

The sophisticated manner in which a modern four-wheel drive vehicle's controlling CPU distributes torque to the wheels obscures the details of transferred power by transforming the vehicle's performance into a seamless and uniform continuity, regardless of road conditions. Variations in a wheel's traction due to a slippery surface result in the delivery of less power to the wheel to avoid slippage. This invisible and comprehensive management of power distribution greatly eases the burden of driving in dangerous situations. However many drivers would like to have, and frequently would benefit from viewing, displayed information regarding the real-time operation of the vehicle and the control system. It is to the presentation of this type of operational information that the present invention is oriented. The various data acquisition means, the related computational processes, the variety of display devices which can be utilized in real time and the various graphical symbols and forms together with their real-time variations are used to present said operating parameters and comprise the essence of the present invention. The manner of accelerating, braking and/or steering by a driver, affect a vehicle's performance. The dynamic display of these parameters therefore is also within the scope of the present invention (which is not limited to these factors).

The preferred images used in said display to convey said operating parameters are meaningful, symbolic, easily understood and spare in style. The presentation is in either black and white or color and the variety of types of display devices enumerated all generally serve to adequately display the needed information. Audible signals and/or warnings can be used to augment these visual presentations. The preferred displays are time-variant, concise and appropriate for the information presented and include a proportional symbolic display, bar charts, a segmented bar chart and variable-size or variable-shape icons or images. Time-variant changes in color, hue, shading, density of cross hatching, contrast, content, shape, orientation, pattern and/or illumination of an image as a function of one or more of said operational parameters are defined as a time-variant highlighted image (which are not limited to these variants).

For four-wheel drive vehicles, the signals from a vehicle's CPU control the amount of torque and/or braking delivered to each wheel and are one source for calculating torque-related and/or braking-related display information. Another method for obtaining such information is by the measurement of variations in the flux produced by electromagnetic clutches which are commonly used by four-wheel drive vehicles to deliver power and/or braking to a wheel. Yet another method for obtaining this information is the monitoring of the signals from said vehicle CPU to the controlling electromagnetic clutches with a clampon or an in-line induction coil monitor around the conductor of these signals or with a signal measuring means inserted in series into the conductor of these signals.

Some four-wheel drive vehicles have fixed differential power delivery means for the front pair of wheels and deliver variable amounts of power, up to half of the total, to the rear wheels. Other four-wheel drive vehicles have fixed differential power delivery means for the rear pair of wheels and deliver variable amounts of power, up to half of the total, to the front wheels. Other systems in use rely upon fluid clutch arrangements which deliver a variable amount to the front or rear pair of wheels or which deliver different amounts to each wheel.

The symbolic display of the relative or absolute power usage by the vehicle's power consuming components with appropriate symbols is useful and novel. Said vehicle power consuming components include lights, stereo equipment, air conditioner, cruise control, a heater, a winch and a power takeoff (which are not limited to these components).

To understand the range of applications and the details of implementing the present invention, reference is made to the drawings. Referring particularly to the figures wherein like-referenced numbers have been applied to like-parts throughout the description as illustrated in the several figures of the drawings. A highlighted item is designated as reference number 16.

Two modes of data acquisition, processing and display of said operating conditions of a vehicle are encompassed by the present invention. These are (1) signals derived from vehicle sensors and/or display signals produced by or derived from a vehicle CPU 32 and which are presented as a display image indicated by the general reference number 11 on the vehicle's display panel 75 and (2) data signals generated by sensors, said sensors monitoring specific vehicle functions and signals. Said data signals being processed by a display CPU 36 and producing display signals, said display signals being displayed as said display image 11 on a display device 30 mounted inside said vehicle in view of the driver. Said display device 30,75 includes an LED, LCD, vacuum fluorescent means, numerical display, GPS display and/or trip computer, gauge or meter. Alternately, said display device 30 is a hand held computer, also called a PDA (and is not limited to these means).

Figure 1:
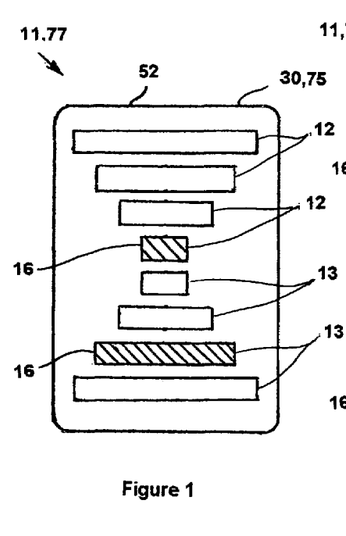
FIG. 1 is a display of a scalar bar diagram image of the braking force on the two rear wheels.
Figure 2:
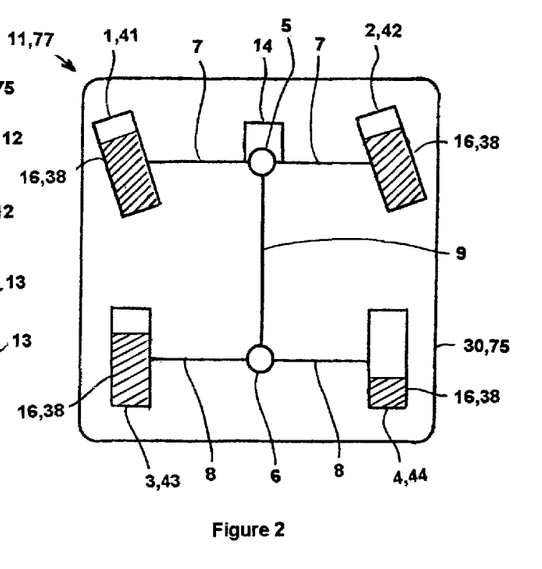
FIG. 2 is a display of four wheel images representing the amplitude of the braking force on each wheel and the turning angle of the front wheels.

FIGS. 1 and 2 are schematic views of said display image 11 within the enclosing display outline of said display device 30,75. FIG. 2 is a schematic display 11 of a drive train comprised of drive train components 1,2,3,4,5,6,7,8,9,14, said display 11 comprised of said enclosing outline 30,75 within which is located a left front wheel 1 represented schematically by a rectangular outline and centrally connected by a front axle 7 represented by a horizontal line to a front transfer case 5 represented by an enclosed circular outline, a right front wheel 2 represented by a schematic rectangular outline and centrally connected by a second front axle 7 schematically represented by a horizontal line to said front transfer case 5, a left rear wheel 3 schematically represented by a rectangular outline and centrally connected by a rear axle 8 schematically represented by a line to a rear transfer case 6 represented by a circular outline, a right rear wheel 4, schematically represented by an rectangular outline and centrally connected by a second rear axle 8 and schematically represented by a line to said rear transfer case 6, a front-rear transfer shaft 9 schematically represented by a line extending from and connecting said front transfer case 5 to said rear transfer case 6, a power source 14 for said vehicle schematically represented by an enclosed rectangular outline adjacent to, above and contacting said front transfer case 5, said front-rear transfer shaft 9 being centrally located together with the other drive train components 1,2,3,4,5,6,7,8,14 within said enclosing outline 30,75, said wheels 3,4 aligned vertically with said front-rear transfer shaft 9 and said wheels 1, 2 angled indicating left turned front wheels 1,2. As the angular position of the outlines of the front wheels 1,2 changes with time to reflect the steering angle of the front wheels 1,2, said image 11 is a variable image designated by the general reference number 77. Said variable image 77 is defined as an image which varies in time in size, shape or highlighting 16.

FIG. 1 is a scalar bar diagram 52 for a four-wheel drive vehicle having at least one upper horizontal bar 12 and having at least one lower horizontal bar 13 said FIG. 1 displaying four upper bars 12 and four lower bars 13, said bars 12, 13 centrally located and centered within said outline 30,75 and said upper bars 12 centered and progressively shorter in length with lower position and said lower bars 13 centered and progressively longer with lower position, said upper bars 12 indicating the amount of torque, if any, being transferred to the front wheels 1,2 and said lower bars 13 indicating the amount of torque, if any, being transferred to the rear wheels 3,4, whereby the highest and longest of said upper bars being highlighted and indicating transfer of torque only to said front wheels 1,2 and whereby the longest and lowest of said lower bars 13 when highlighted 16 indicating transfer of torque only to said rear wheels 3,4, and whereby when torque is transferred to said front wheels 1,2 and to said rear wheels 3,4, one bar in each set of bars 12,13 is highlighted 16 in proportion to the relative torque being transferred to said front wheels 1,2 and to said rear wheels 3,4. As shown, substantially more torque is being transferred to the rear wheels 3,4 than to the front wheels 1,2.

Figure 3:
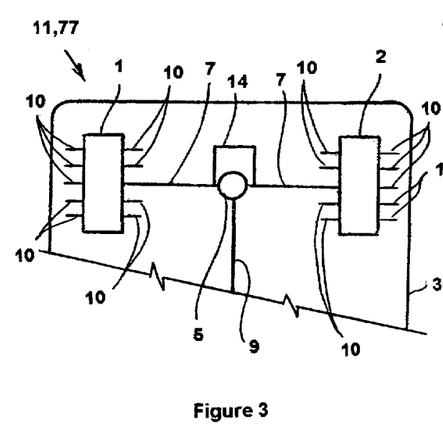
FIGS. 3 and 4 are displays of wheel images indicating the amplitude of the braking force on each wheel.
Figure 4:
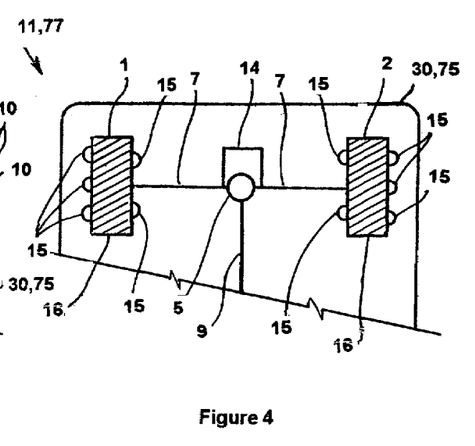

FIGS. 3 and 4 are the upper portions of said drive train display 11,77 as shown in FIG. 2 in a braking situation within said enclosing outline 30,75. FIG. 3 shows said braking condition by action of the driver and/or by said vehicle CPU 32 by presenting short parallel horizontal lines 10 extending outward from the inner and outer edges of each of said outlines of said wheels 1,2. FIG. 4 shows an alternative embodiment of said display 11 of said braking condition by highlighted areas 16 shown within each of said outlines of said wheels 1, 2. FIG. 4 also shows a further embodiment of said display 11 of said braking condition by presenting semicircular arcs 15, the bases of said semicircular arcs attached to and extending away from either side away from each of said outlines of said wheels 1,2, it being understood that the same presentations are also used for said rear wheels 3,4. Said semicircular arcs represent passive braking using an engaged power source 14 to slow the vehicle. Variations in the length or number of said lines 10 in FIG. 3 indicating the relative amount of braking on each wheel. Alternatively, the size of or number of said semicircular arcs 15 indicates the relative amount of braking.

Figure 5A:
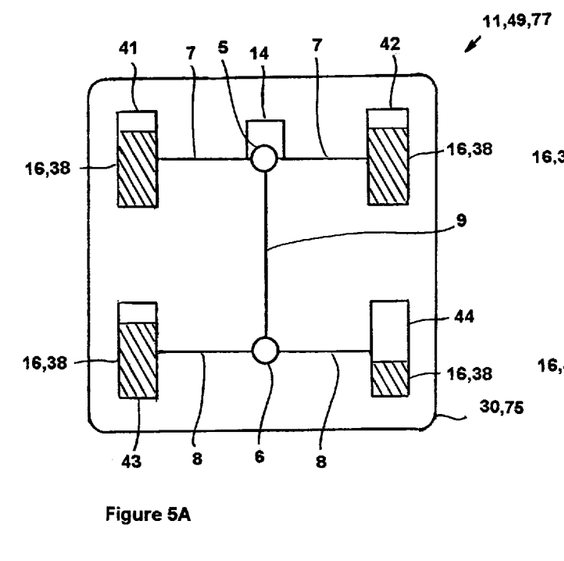
FIG. 5A is a display of four wheel images representing the amplitude of the braking force on each wheel.
Figure 5B:
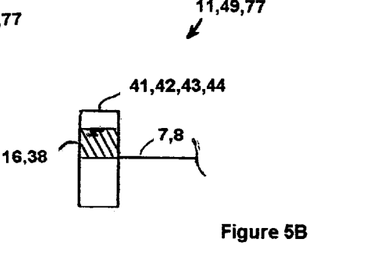
FIGS. 5B and 5C are displays of wheel images representing the amplitude of the relative amount of torque delivered to each of four wheels.
Figure 5C:
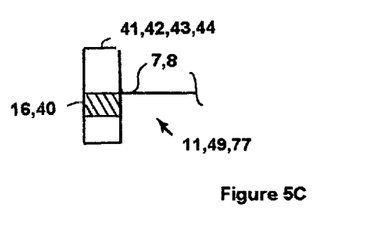

FIG. 5A is a schematic bar chart drive train display 11,49 as disclosed in FIG. 2, bar chart indicators 41, 42, 43, 44 respectively highlighting the outlines of said wheels 1,2,3,4 the relative amplitudes 38 of said bar charts 41,42,43,44 indicating the relative amounts of torque respectively transferred to each of said wheels 1,2,3,4 being transferred to the right rear 4 wheel as shown is less than to the other wheels 1,2,3. In like manner FIG. 5B presents a display 11,49 with delivered torque 38 extending upward from the middle of said outline 41,42,43,44 and FIG. 5C presents a display indicating the braking force in the same bar chart 41,42,43, 44 by an increase in amplitude 38 in the downward direction from the middle of said outline 41,42,43,44. Further, in FIG. 1, the shading 16 within said outlines 41,42,43,44 represents the amplitude 38 of braking for each wheel with the right rear wheel 4 showing a reduced amount of braking due to the action of the controller 48 of an ABS system.

Figures 6A, 6B, 7A:
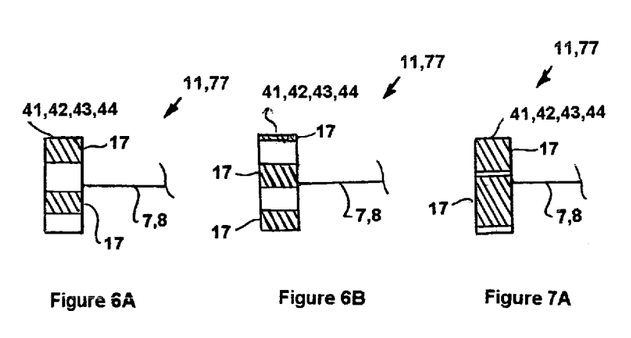
FIGS. 6A, 6B, 7A and 7B are each a display of a wheel image indicating the amplitude of the torque delivered to a wheel.
Figure 7B:
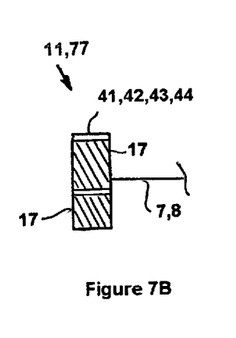

In another embodiment of the invention FIG. 6A and FIG. 7A are schematic views of an image 11,77 of one of said outlines of said wheels 1,2,3,4 as shown in FIG. 2 comprised of at least one highlighted horizontal band 17, two of said at least one band being shown. FIGS. 6B and 7B are respective schematic views of said outlines of said wheels 1,2,3,4 at a time interval slightly after that shown in FIGS. 6A and 7A. Said at least one band 17 giving the appearance of moving downward, as viewed in successive images, indicating movement of said wheels 1,2,3,4, a greater number of said dark bands and/or a greater apparent downward speed as in FIGS. 7A and 7B indicating an increase in speed and/or indicating increased transfer of torque. The display of a greater area of said bands 17 in FIGS. 7A and 7B also indicating transfer of relatively more torque to a wheel. The rate of downward movement of said bands 16,17 in an outline of one wheel indicating a faster rotating wheel or slippage relative to the other wheels.

Figures 8A, 10E:
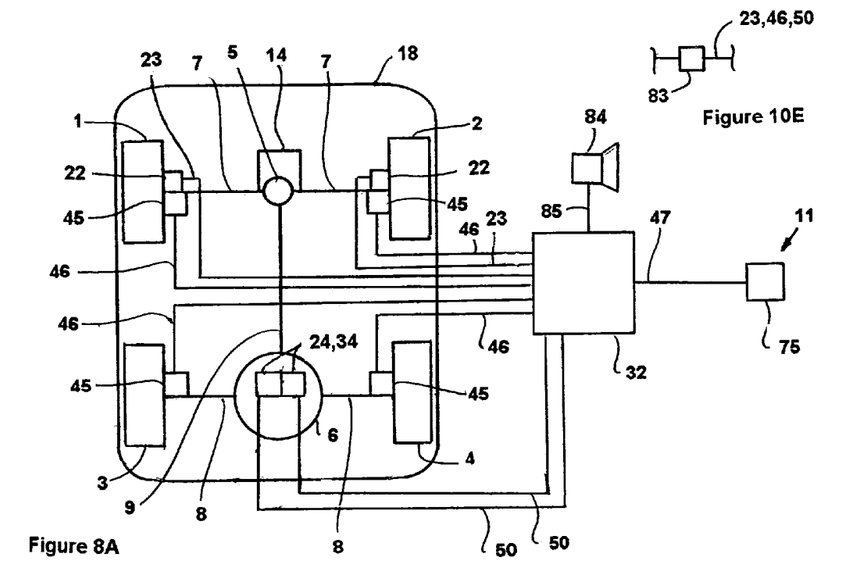
FIGS. 8A, 8B and 9 are each a diagram of a system schematically showing component monitoring, data processing means and an image display.
FIG. 10E schematically illustrates an in-line current sensing device.

FIG. 8A is a schematic diagram of a four-wheel drive vehicle as shown in FIG. 2 and having an enclosing outline 18 representing said vehicle, said drive train components, 1,2,3,4,5,6,7,8,9,14 centered within said outline 18 and further comprising a vehicle CPU 32, said display device 75, at least one electromagnetic clutch 24, at least one controller 34 for said at least one electromagnetic clutch 24 at or contained within said rear transfer case 6, at least one connector 50 connecting said at least one controller 34 to said vehicle CPU 32, two electromagnetic clutches 24 and two connectors 50 being shown, a wheel speed sensor 45 on or at least one of said wheels 1,2,3,4, a wheel speed connector 46 connecting at least one of said wheel speed sensors 45 to said vehicle CPU 32, a wheel steering angle sensor 22 on at least one of said front wheels 1,2, at least one wheel steering angle sensor connector 23 connecting said at least one of said wheel steering angle sensor 22 to said vehicle CPU 32, said vehicle CPU 32 computing display signals, said display signals being conducted by a connector 47 to said display device 11,75 for display.

Figures 9, 10A, 10B:
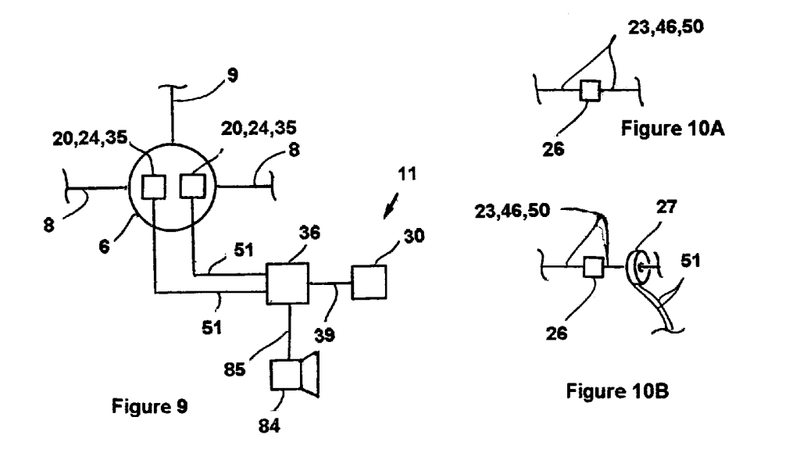
FIG. 10A schematically illustrates an in-line connector.
FIG. 10B schematically illustrates an in-line connector and an inserted coil.

FIG. 9 schematically discloses the processing of information from at least one flux sensor 35, a Hall effect sensor, affixed to said at least one electromagnetic clutch 24 in said rear transfer case 6 by affixing means, said affixing means comprised of high temperature tape 20, said information conducted by a conductor 51 to said display CPU 36 and by said conductor 39 transfers display information to said display device 11,30.

Figure 10C:
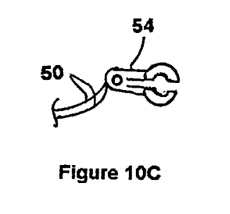
FIGS. 10C and 10D illustrate a clamping induction coil.
Figure 10D:
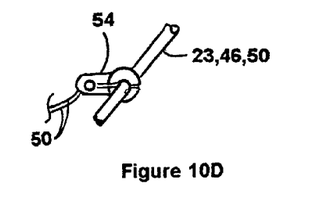

FIG. 10A is a diagram of an in-line connector 26 in a conductor 23,46,50. FIG. 10B sows said conductor 23,46,50 with a toroidal coil 27 slid over the end of said conductor 23,46,50 when said in-line connector 26 is unconnected, said in-line connector 26 then being reconnected. Said toroidal coil 27 then providing, by induction means through conductors 51, a signal for processing by said display CPU 36. FIGS. 10C and 10D show an alternate method of monitoring said wire 23,46,50 using a clamping induction coil 54 clamped over said conductor 23,46,50. FIG. 10E shows an in-line current sensor 83.

Figures 8B, 17C, 17D, 19A:
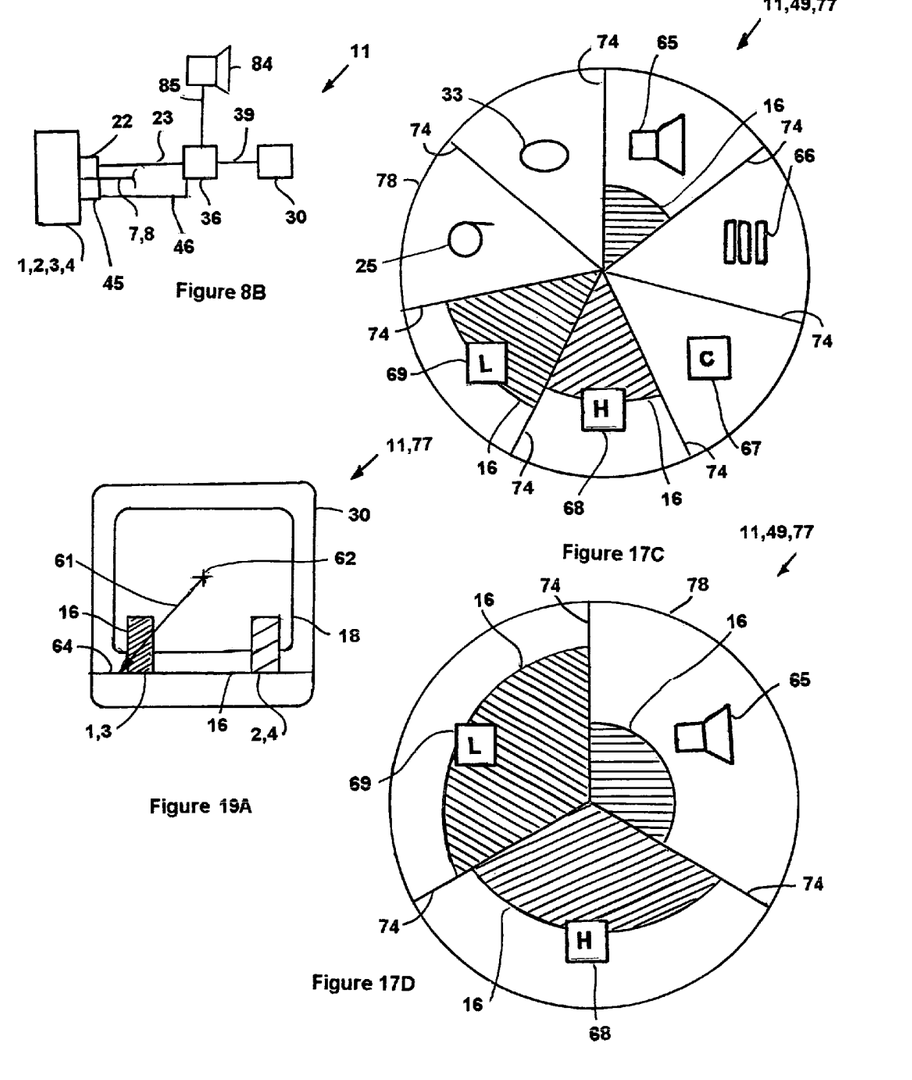
FIGS. 17C and 17D each illustrate a bar chart pie segment display of images of power consuming components of a system.
FIGS. 19A and 19B each illustrate a display indicating the approach to a rollover condition.
Figure 14:
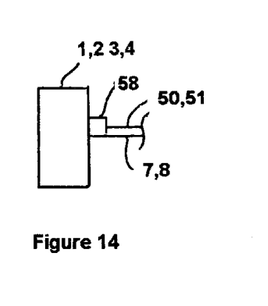
FIG. 14 schematically illustrates placement of a wheel load sensor.

FIG. 8B is a schematic diagram as in FIG. 8A but showing one wheel 1,2,3,4 with a steering angle sensor 22 connected by a conductor 23 to said display CPU 36 and an affixed speed sensor 45 connected by a conductor 46 to said display CPU 36, said additional CPU 36 connected by a conductor 39 to said display device 30. FIG. 14 shows a wheel load sensor 58 with data signals transmitted by a conductor 50. It being understood that said toroidal coil 27 terminating in conductors 51 as shown in FIG. 10B or said clamping induction coil 54 as shown in FIGS. 10C and 10D provide an alternate means of providing the signals from conductors 23,46,50 from said sensors 22,45,58 to said display CPU 36 and by conductor 39 transfers display information from said display CPU 36 to said display device 30.

Figure 11A:
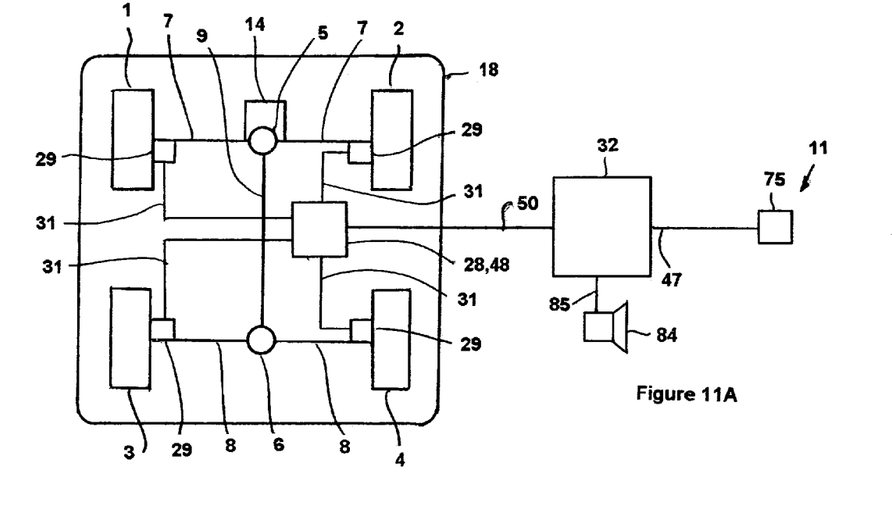
FIGS. 11A and 11B are each a schematic diagram of an ABS system monitoring, data processing means and an image display.

FIG. 11A schematically shows, as in FIG. 8A, at least one sensor 35 at and affixed to the master brake cylinder and controller 28 and/or to the ABS controller 48 with brake lines 31 to the brake 29 at each wheel 1,2,3,4 and a connector 50 connecting said controller 48 to said vehicle CPU 36 and by conductor 39 transfers display information from said display CPU 36 to said display device 30.

Figure 11B:
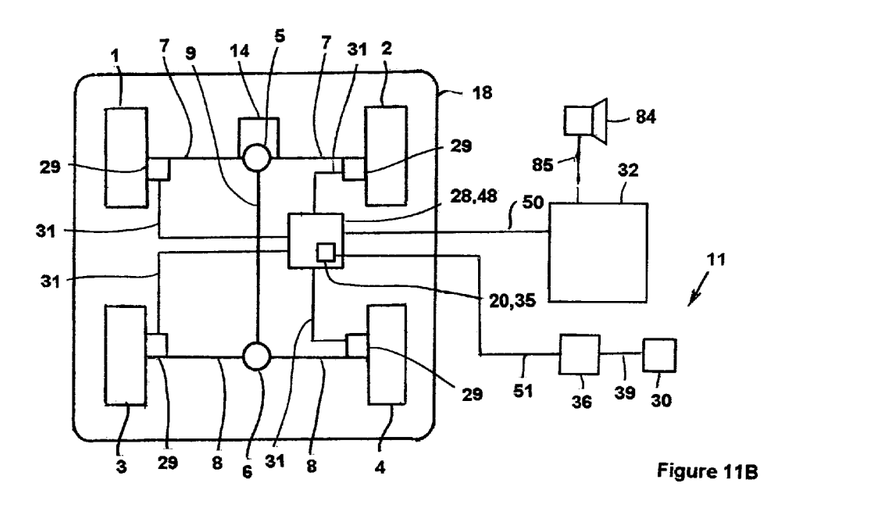

FIG. 11B schematically shows, as in FIG. 11A, a flux sensor 35 affixed to said master brake cylinder and controller 28, a connector 51 from said flux sensor 35 to said display CPU 36 and by said conductor 39 transfers display information from said display CPU 36 to said display device 11,30. Said flux sensor 35 be affixed to said master brake cylinder and controller 28 by affixing means, duct tape 20 being shown as an affixing means. It being understood that said toroidal coil 27 terminating in conductors 51 as shown in FIG. 10B provides an alternate means of monitoring braking signals in said conductor 50 between said vehicle CPU 32 and said master brake cylinder and controller 28, said toroidal coil leads 51 being connected to and transmitting said signal to said display CPU 36, said vehicle CPU 32 computing display signals, said display signals being conducted by a connector 47 to said display device 75 for display.

Figure 13:
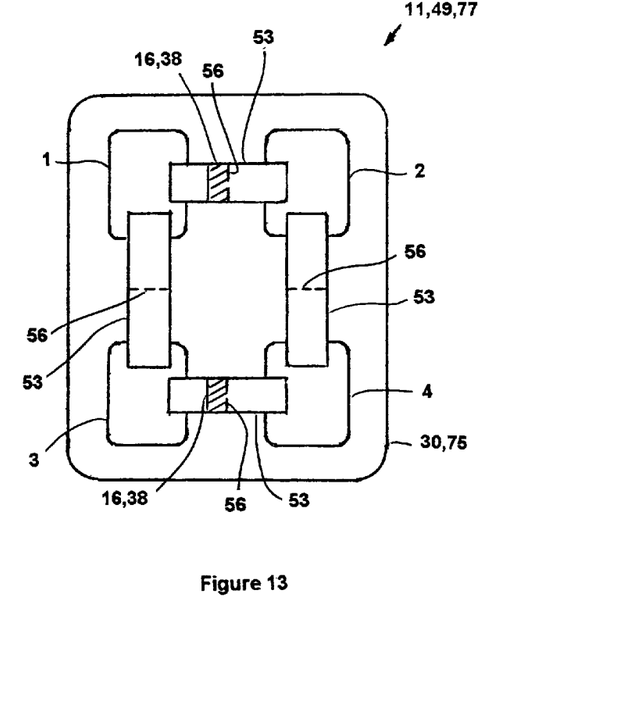
FIG. 13 is a display of a torque distribution image.
Figure 15:
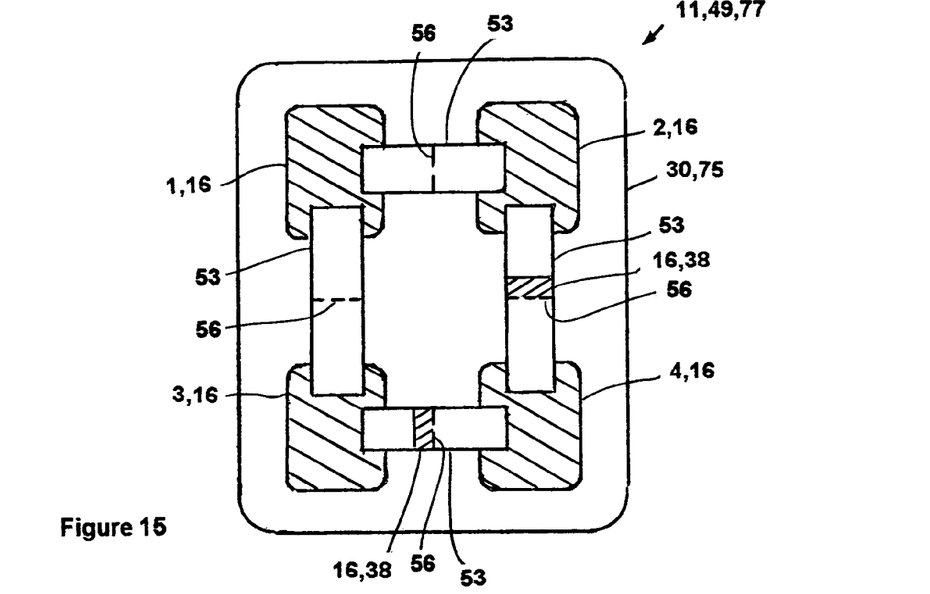
FIG. 15 illustrates a display of torque and braking representations for four wheels.
Figure 16:
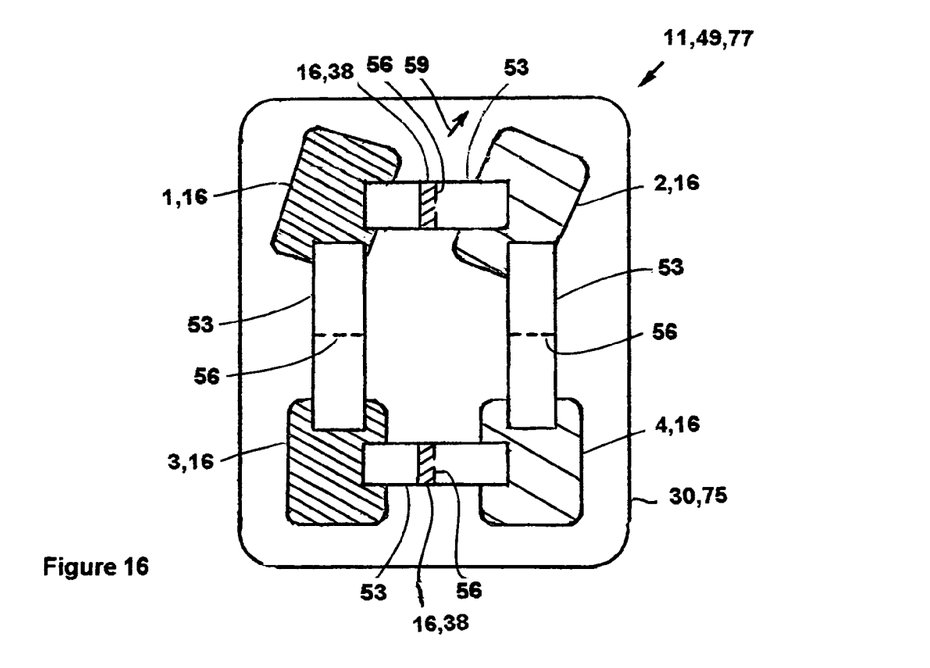
FIG. 16 illustrates a display of torque, braking and steering representations for the wheels of a four wheel vehicle.

In one embodiment as shown in FIGS. 13,15,16, the schematic outlines of said wheels 1,2,3,4 are represented by rounded rectangles 1,2,3,4 within a display outline 30,75. The net difference in torque or braking between adjacent pairs of wheels, 1,2 or 2, 4 or 3,4 or 1,3, is displayed by indicator bar 53 whose ends are situated within the boundary of each of said pair of rounded rectangles 1,2,3,4. Said four indicator bars 53 are divided at their mid points by a dividing dashed line 56. A relative increase in the delivered torque or braking to one wheel is indicated by shading extending from said divider 56 toward that wheel as a form of a bar chart 16,38.

Figure 12A:
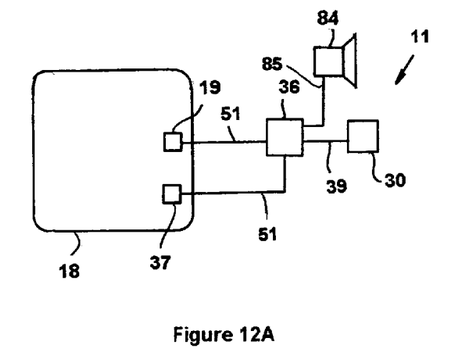
FIGS. 12A and 12B are each a schematic diagram of an accelerometer and harmonic frequency sensor, data processing means and an image display.
Figure 12B:
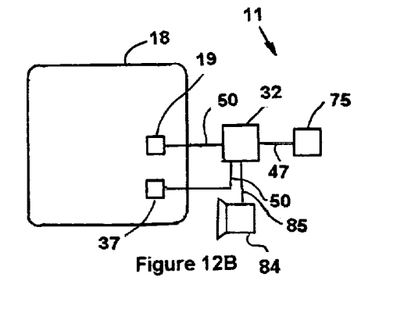
Figure 19B:
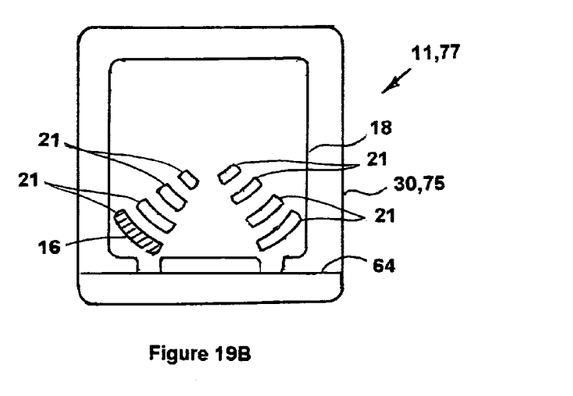

The stability of a vehicle is displayed as the approach of a vehicle to a rollover condition to one side or the other with a gravity or accelerometer direction sensor 37 together with a harmonic frequency analyzer 19, as shown in FIG. 12B is used by said vehicle CPU 36 to determine the true center of gravity and to calculate the approach of a vehicle to a rollover condition. Said resonance frequency sensor 19 calculates the true center of gravity by determining the principal resonance frequency in a side to side resonance mode relative to the ground and the gravity direction sensor 37 determines the true angle to one side or the other arising from a combination of gravitational and acceleration forces resulting in production of information transferred to said vehicle CPU 36, said vehicle calculating the net lateral acceleration force vector 61 as shown in FIG. 19A. Said display CPU 36 generates display information for said display device 75 indicating the approach of a rollover condition. When said vector 61 acting from the center of gravity 62 of the vehicle, falls outside the track of the wheels on one side, 1,3 or 2,4, the vehicle will overturn. In like manner, FIG. 12A shows information from said sensors 19,37 conducted by conductors 51 to said display CPU 36, said display CPU 36 creating said display information and transmitting it by conductor 39 to said display device 30 for display as shown in FIGS. 16,19A and 19B.

FIG. 19A is a schematic rear view of an outline of a vehicle with four wheels 1,2,3,4 resting on the ground 64, a center of gravity 62 indicator centered in an outline 18 of said vehicle centered in said display outline 30,75, a vector arrow 61 from said center of gravity 62 angled downward toward the left side and ending outside of the wheel track of wheels 2,4 to the ground 64 on the left side of said vehicle. Alternately or in addition, the wheel pairs 1,3 and 2,4 can be highlighted 16 as in FIGS. 15,16 to indicate a difference in the amount of loading of the wheels 1,2,3,4. FIG. 19B is another representation of the rollover condition shown in FIG. 19A, wherein the outline 18 of the vehicle encloses two sets of indicator bars, each of said set of indicator bars 21 commencing near the center of said outline 18 and with increasing size bars 21 positioned downward to either side, the lower of said indicator bars 21 being progressively larger and all bars 21 preferably being arc shaped. As shown the lowest leftmost indicator bar 21 being highlighted 16 indicating the approach of a rollover condition to the left side.

Alternately, in another embodiment of a method or means for displaying approach of a rollover condition, a load bearing sensor 58 on each wheel is monitored, with connectors 50 to said vehicle CPU 32 or with connectors 51 to said display CPU 36, as shown schematically in FIG. 14 and presenting a display 11 as shown in FIGS. 13,15,16 of the shown the lowest leftmost indicator bar 21 being highlighted 16 indicating the approach of a rollover condition to the left side.

Alternately, in another embodiment of a method or means for displaying the approach of a rollover condition, a load bearing sensor 58 on each wheel is monitored, with connectors 50 to said vehicle CPU 32 or with connectors 51 to said display CPU 36, as shown schematically in FIG. 14 and presenting a display 11 as shown in FIGS. 13,15,16, of the difference in the loading on one side compared to the other side thus displaying the approach of a rollover condition. It is understood that the stability information required to present the images in FIGS. 13,15,16 can be obtained by the harmonic frequency sensor 19 and gravity direction sensor 37 as described above and shown in FIG. 20. Alternately, the image 11 shown in FIGS. 19A and 19B can also be calculated and displayed from data acquired from said load sensors 58.

FIGS. 15 and 16 are similar to the presentation in FIG. 13 but said rounded outlines of the wheels 1,2,3,4 are highlighted 16 with the shading proportional to the weight borne by each wheel. Variations in highlighting 16 representing reduced or no loading on one side and the approach of a rollover condition. FIG. 16 also includes information as to the steering angle of the front wheels 1,2 which information is acquired from at least one steering angle sensor 22 as shown in FIG. 8A or 8B.

Figure 17A:
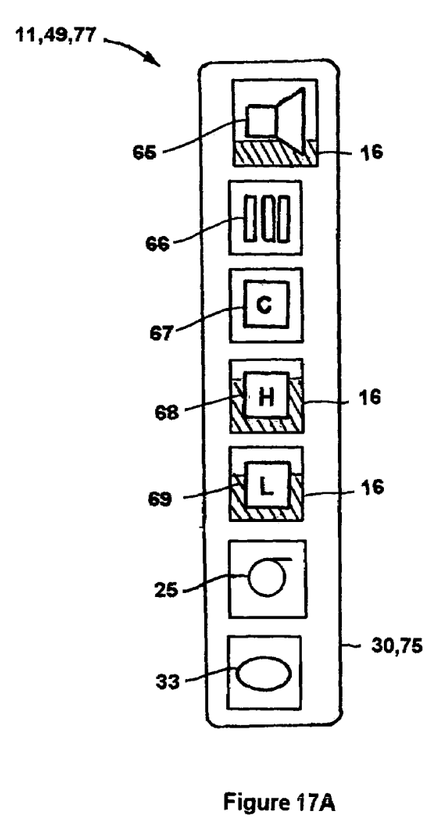
FIGS. 17A and 17B each illustrate a display of symbols and/or numerals, each representing the power consumption of a system component.
Figure 17B:
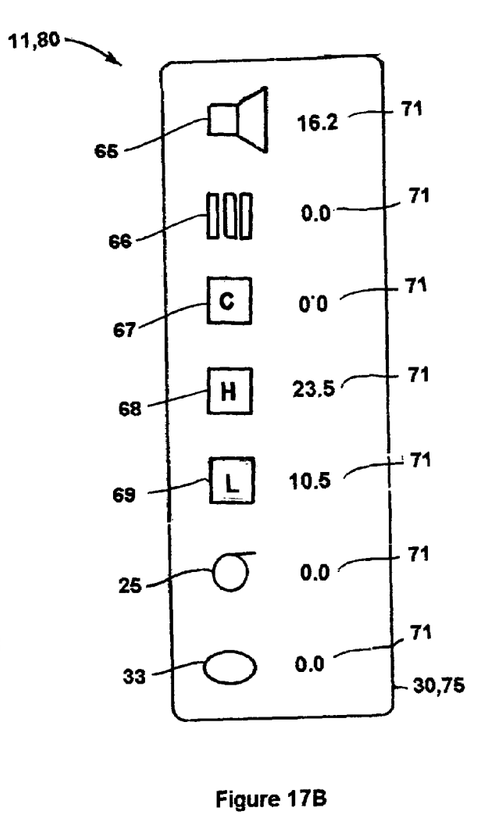

FIGS. 17A is a display 11 of power consuming symbols with a background bar chart 49 associated with each symbol 65,66,67,68,69,25,33, said symbols comprising, a stereo system 65, an air conditioning system 66, a cruise control system 67, a heating system 68, a lighting system 69, a winch 25 and a power takeoff unit 33 (which is not limited to these components). In FIG. 17B the same symbols 65,66,67,68,69,25,33 are presented with numerical values of associated power consumption rates adjacent to each of said power consuming symbols and said display 11 is termed a numerical display 80. FIG. 17C presents the same information in a pie chart with radial bar chart elements as background to each symbol 65,66,67,68,69,25,33. FIG. 17D is similar but only shows the power components, 65,68,69 in use. FIGS. 17C and 17D are termed bar charts 49 in pie segment format 78.

Figure 18A:
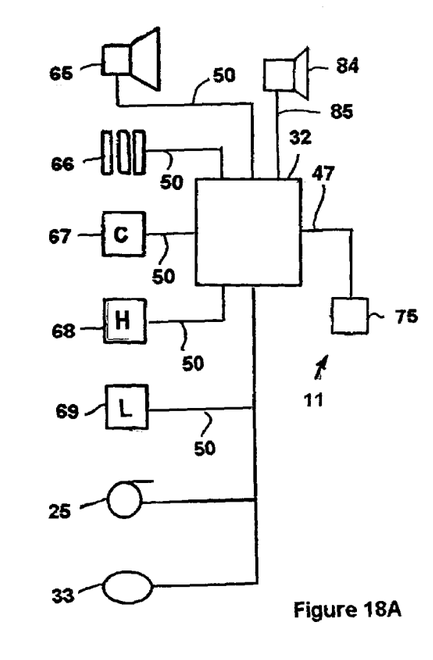
FIGS. 18A and 18B are each a schematic diagram of power component monitoring, data processing means and an image display.
Figure 18B:
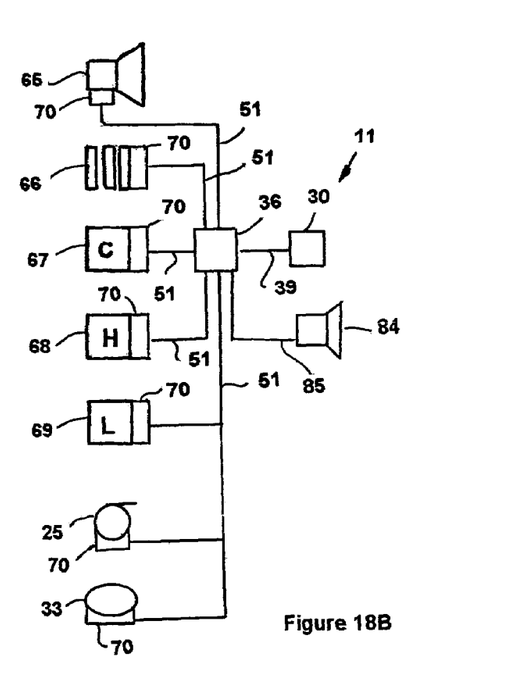

FIGS. 18A and 18B are diagrams of power consuming components, 65,66,67,68,69,25,33 connected by connectors 50 in FIG. 18A to said vehicle CPU 32 and in FIG. 18B by connectors 51 to said display CPU 36. Said vehicle CPU 32 is connected to display device 75 by connector 47 and said display CPU 36 is connected with display device 30 by connector 39.

Time-variant display image 11, as presented in the various figures, are defined as one or more of said bar charts 49, scalar bar diagrams 52, variable-size or variable-shape icons 77 and/or bar charts in pie segment format 78 (which are not limited to these images).

Figure 20:
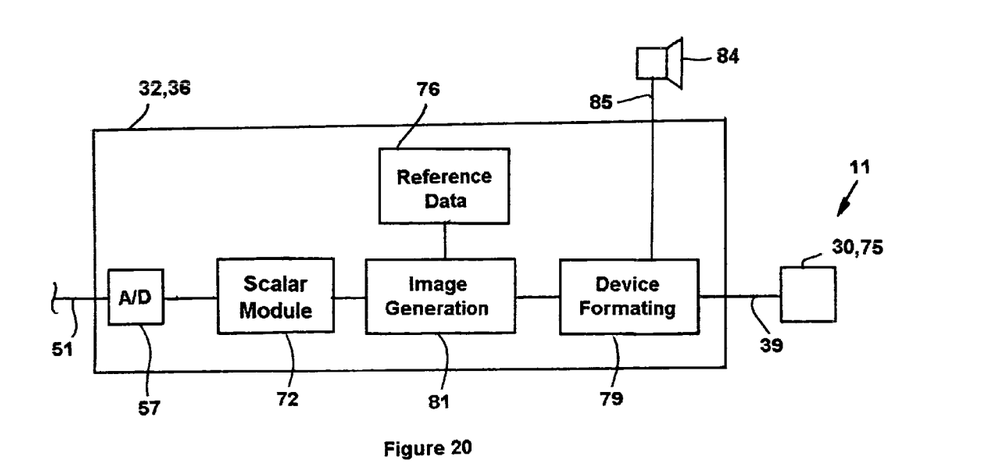
FIG. 20 is a flow chart illustrating functional processing of information by a display CPU and system.

FIG. 20 shows a schematic diagram of said vehicle CPU 32 or said display CPU 36 with said input signal 51 processed to produce said output signal 39 to said display device 30,75 whereby said input signal 51 is processed by an analog to digital (A/D) converter 57 producing a signal which is modified by a scalar module 72, said scalar processing module 72 comprised of a means to increase the delay or time constant of a peak response allowing said peak to permit continuity in viewing said image 11 on said display 30,75, said scalar module 72 producing a signal which is modified by an image generation module 81, a reference data module 76 providing image data to said image generation module 81, said image generation module 81 providing input for a device formatting module 79 and said device formatting module 79 providing said display data 39 to said display device 30,75 and said display device 30,75 displaying said displayed image 11. It being understood that said formatting means 79 is dedicated to a single type of display device 75 for said vehicle CPU 32 and to multiple types of display devices 30 for said display CPU 36.

An alarm speaker 84 connected by a connector 85 to said vehicle CPU 32 or to said display CPU 36 is shown in FIGS. 8A,8B,9,11A,11B,12A, 12B,18A,18B,20 and provides audible signals to said operator of the status of vehicle operations.

The operation of the invention is as follows. A display 30,75 is mounted within view of the driver of a motor vehicle and the image displayed indicates the operation of an anti-lock braking system (ABS) and/or the behavior of the vehicle as to stability, that is, to the approach of a rollover condition of a vehicle, as to the power consumed by vehicle components and/or, for four-wheel drive vehicles, operation of the vehicle as to the torque and/or braking forces delivered to the wheels 1,2,3,4. The sensor information required to provide this display 11 is obtained from a steering angle sensor 22 to determine the steering angle of the front wheels, a flux sensor 35 for monitoring at least one electromagnetic clutch 24 to determine the delivered torque to a wheel 1,2,3,4, a harmonic frequency sensor 19 to determine the center of gravity of the vehicle and a gravity direction sensor 37 to determine the over approach of a rollover condition, a wheel load sensor 58 at each wheel 1,2,3,4, an alternate means to determine the approach of a rollover condition, a flux sensor 35 on the ABS controller 48 alone or on the master brake cylinder 28 monitoring the braking force delivered to the wheels 1,2,3,4 and/or sensors 26,54,83 monitoring the conductors 23,46,50 of signals containing this information and provided to or generated by said vehicle CPU 32. A separate display CPU 36 and/or said vehicle CPU 32 generate the display signals for a display device 30,75 producing an image 11 in the form of a scalar bar diagram 52, a schematic display of a drive train with components 1,2,3,4,5,6,7,8,9,14, with bar chart indicators 38 in the outlines of wheels 41,42,43,44 of braking and/or delivered torque or by line extensions 10 from said outlines 41,42,43, 44 or, alternately, by passive braking by semicircles 15 on the sides of said outlines 41,42,43,44 or, alternately, by moving bands 17 within said outlines 41,42,43,44, by displays of the relative torque delivered by adjacent wheels, side to side 1,2 and 3,4 and/or front to back 1,3 and 2,4 with bar charts 38, stability of the vehicle be displayed by variations in the shading 16 of the outline of the wheels 1,2,3,4 or, alternately, by vector means 61 within a vehicle outline 18 or, alternately, by arc indicators 21 within a vehicle outline 18 and the amount of absolute or relative power consumption by vehicle components in bar charts 49 or, alternately, with numerical displays 71 associated with component icons 65,66,67,68,69,25,33 or, alternately, with bar charts in pie segment format 78 for all components or for only those components in use. Said display device 30,75 includes an LED, LCD, vacuum fluorescent means, numerical display, GPS display and/or trip computer, gauge or meter. Alternately, said display device 30 is a hand held computer, also called a PDA. Said shading or highlighting 16 includes time-variant changes in color, hue, shading, density of cross hatching, contrast, content, shape, orientation, pattern and/or illumination (which are not limited to these variants) of said image 11 as representative of the functioning of one or more of said operational parameters.

The term "a proper vehicle" is defined as a four-wheel drive vehicle, including a frame supported by wheels for movement over the ground, said wheels comprised of a pair of front wheels and a pair of rear wheels, one of said pairs being main drive wheels, and the other of said pairs being auxiliary drive wheels, a driving force control system controlling engagement forces of at least one control clutch to thereby control at least one driving force distributed to said auxiliary drive wheels, a power source which is mounted on said frame and which drives said main drive wheels, an operators seat mounted on said frame, a steering system enabling the operator to steer the vehicle, said at least one control clutch comprised of an electromagnetic clutch and said at least one distributed driving force monitored by a sensing means.

Thus it has been shown that an improved means for the display of operational information for a vehicle can be accomplished. All of the above are only some of the examples of available embodiments of the present invention. For example, an auto calibration or self testing mode for standardizing the presentation of such information can be utilized. The communication means between said display CPU 36 and said display device 30 can be by infrared or wireless means. The algorithms needed to convert given signals to meaningful display quantities vary substantially but would be obvious to one skilled in the art for such applications. A means of securement of the Hall effect sensors can be accomplished by a variety of attachment means other than by using high temperature tape. The torque transferred to an axle can also be determined by use of an induction coil or by a strain gauge. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

What is claimed is:

1. A data collection and display system for a proper vehicle comprising:
   at least one sensing means producing at least one source electric signal proportional to the distributed driving force of said proper vehicle;
   at least one calculating means converting said at least one source electric signal to at least one electric display signal;
   at least one electric signal transmission means connecting said sensing means to said at least one calculating means;
   at least one display means; and
   at least one electric display signal transmission means connecting said at least one calculating means to said at least one display means,
   whereby said at least one electric signal transmission means transfers said at least one source electric signal from said sensing means to said at least one calculating means, said calculating means creating at least one electric display signal, said at least one electronic display signal transmitted by said at least one electric display signal transmission means to said at least one display means, said display means creating an image visible to the operator of said proper vehicle, said image proportionally depicting said driving force.

2. A data collection and display system as in claim 1, wherein said at least one sensing means is a Hall effect sensor.

3. A data collection and display system as in claim 1, wherein said at least one sensing means monitoring a conductor, said conductor transmitting said control of said driving force, said at least one sensing means comprised of a clampon induction sensor or an in-line induction sensor or an in-line series current sensor.

4. A data collection and display system as in claim 1 wherein, said image is at least one bar chart, scalar bar chart, or an image displaying the torque or braking force delivered to the wheels or an image displaying the torque or braking force delivered to the front pair of wheels and to the rear pair of wheels or an image displaying the slippage of one or more wheels with regard to the other wheels.

5. A data collection and display system as in claim 1 wherein, said image is comprised of a display varying in time in one or more characteristics to include color, hue, shading, density of cross hatching, contrast, content, shape, orientation, pattern and/or illumination.

6. A data collection and display system as in claim 1, wherein said at least one display means is an LED, LCD, vacuum fluorescent means, GPS display and/or trip computer, numerical display, gauge, meter and/or PDA.

7. A data collection and display system for a proper vehicle comprising:
   a CPU controlling engagement forces of one or more of the wheels;
   at least one sensing means producing an electrical input signal proportional to said engagement forces and providing said signal to said CPU;
   at least one display signal generated by said CPU derived from said input signal, said display signal proportional to said engagement forces; and
   at least one display device;
   whereby said at least one display signal is transferred from said CPU to said display device, said display device displaying an image proportional to said engagement forces to the operator.

8. A data collection and display system as in claim 7 wherein, said image is comprised of a display varying in time in one or more characteristics to include color, hue, shading, density of cross hatching, contrast, content, shape, orientation, pattern and/or illumination.

9. A data collection and display system as in claim 7, wherein said at least one display means is an LED, LCD, vacuum fluorescent means, GPS display and/or trip computer, numerical display, gauge, meter and/or PDA.

10. An apparatus comprising:
    at least one signal source producing sensory data;
    a processing device operably coupled to said signal source to transform said sensory data into a display signal; and
    a display device to receive and display said display signal as a viewable image, said image comprised of information regarding at least one operating parameter, said at least one operating parameter comprised of torque and/or braking forces delivered at the wheels of a motor vehicle;
    whereby said image is observable by the operator of said motor vehicle.

11. An apparatus as in claim 10 wherein said at least one signal source is a sensor comprised of a brake signal amplitude sensor, a torque amplitude signal sensor, an in-line induction sensor, an inserted serial current sensor, a clampon induction sensor and/or a flux sensor.

12. An apparatus as in claim 10 wherein said image is at least one bar chart, scalar bar chart, or bar chart in pie segment format or, is an image displaying the torque or braking force delivered to the wheels or, is an image displaying the torque or braking force delivered to the front pair of wheels and to the rear pair of wheels or an image displaying the slippage of one or more wheels with regard to the other wheels.

13. An apparatus as in claim 10 wherein said processing device is comprised of a vehicle CPU or a display CPU.

14. An apparatus as in claim 10, wherein said display device is a LED, LCD, vacuum fluorescent means, GPS display or trip computer, numerical display, gauge, meter and/or PDA.

15. An apparatus as in claim 10, wherein said at least one image is comprised of a highlighted image and/or a display varying in time in one or more characteristics to include color, hue, shading, density of cross hatching, contrast, content, shape, orientation, pattern and/or illumination.

16. A system comprising:
    a first data signal generation means affixed to or within a vehicle and producing a first data signal, said first data signal generation means comprised of a lateral acceleration sensor;
    a first interface to receive said first data signal;
    a second data signal generation means affixed to or within said vehicle and producing a second data signal, said second data signal generation means comprised of a harmonic frequency sensor;
    a second interface to receive said second data signal;
    a processing device operably coupled to said interfaces to transform said data signals into at least one frame of display data; and
    a display device displaying said at least one frame of display data for the operator of said vehicle;
    whereby said display data comprises at least one image indicating the approach of a rollover condition of said vehicle.

17. A system as in claim 16, wherein said processing device is comprised of a vehicle CPU or a display CPU.

18. A system as in claim 16, wherein said display device is a LED, LCD, vacuum fluorescent means, GPS display and/or trip computer, numerical display, gauge, meter and/or PDA.

19. A system as in claim 16 wherein said image is comprised of a display varying in time in one or more characteristics to include color, hue, shading, density of cross hatching, contrast, content, shape, orientation, pattern, illumination and/or highlighting.

20. A system as in claim 16 wherein said image is comprised of a display of at least one bar chart, scalar bar chart or bar chart in pie segment format.

21. A method comprising:
    generating a data signal from at least one sensor attached on or within a motor vehicle;
    processing said data signal producing at least one display image; and
    displaying said at least one display image on a display device observable by the operator of said motor vehicle;
    whereby said at least one display image comprising at least one image representing information regarding at least one vehicle operating parameter, said at least one operating parameter comprised of torque and/or braking forces delivered at the wheels of said motor vehicle.

22. A method as in claim 21, wherein said vehicle is a four-wheel drive vehicle.

23. A method as in claim 21, wherein one of said operating parameters displayed is the steering angle of the front wheels.

24. A method as in claim 21, wherein said at least one sensor is comprised of a torque amplitude signal sensor.

25. A method as in claim 21, wherein said processing is by said vehicle's CPU or by a display CPU.

26. A method as in claim 21, wherein said displaying is with a LED, LCD, vacuum fluorescent means, GPS display, numerical display, gauge, meter and/or PDA.

27. A method as in claim 21, wherein said at least one display image is a bar chart, scalar bar chart, bar chart in pie segment format, a numerical display or an image displaying the torque or braking force delivered to the wheels or an image displaying the slippage of one or more wheels with regard to the other wheels.

28. A method as in claim 21, wherein said image is comprised of a display varying in time in one or more characteristics to include color, hue, shading, density of cross hatching, contrast, content, shape, orientation, pattern, illumination and/or highlighting.

29. An image creating and sound creating device comprising:
    a first data signal generation means affixed on or within a vehicle and producing a first data signal;
    a first interface to receive said first data signal;
    a second data signal generation means affixed on or within said vehicle and producing a second data signal, said second data signal generation means comprised of a harmonic frequency sensor;
    a second interface to receive said second data signal;
    a processing device operably coupled to said interfaces to transform said first and second data signals into at least one frame of display data and into an electronic sound signal;
    a display device displaying said at least one frame of display data for the operator of said vehicle; and
    a sound producing device converting said electronic sound signal to audible sound for said operator;
    whereby said display data comprising said at least one frame of display data is displayed and/or said sound producing device creates said audible sound regarding at least one vehicle operating parameter and said at least one operating parameter is the approach of a rollover condition of said vehicle.

30. The device of claim 29, wherein said vehicle is a four-wheel vehicle.

31. The device of claim 29, wherein said first data signal generation means is a lateral acceleration sensor.

32. The device of claim 29, wherein said processing device is comprised of a vehicle CPU or a display CPU.

33. The device of claim 29, wherein said display device is a LED, LCD, vacuum fluorescent means, GPS display and/or trip computer, numerical display, gauge, meter and/or PDA.

34. The device of claim 29, wherein said image is at least one bar chart, scalar bar chart, bar chart in pie segment format, a numerical display and/or an image displaying the approach of a rollover condition of a vehicle.

35. The device of claim 29, wherein said at least one image is comprised of a display varying in time in one or more characteristics to include color, hue, shading, density of cross hatching, contrast, content, shape, orientation, pattern, illumination and/or highlighting.

36. An item comprising a medium storing instructions that, if executed, enable a system to perform steps comprising:
- receiving a data signal comprised of information regarding at least one operating parameter;
- generating from said data signal a command;
- transforming said data signal based on the command into display information; and displaying said display information on a display for the operator of a motor vehicle; whereby said at least one operating parameter comprises the power consumption of a vehicle component.

37. The item of claim 36, comprising a medium storing instructions that, if executed, enable a system to perform steps to transform said data signal by using a vehicle CPU or a display CPU.

38. The item of claim 36, comprising a medium storing instructions that, if executed, enable a system to display said display information on a LED, LCD, vacuum fluorescent means, GPS display and/or trip computer, numerical display, gauge, meter and/or PDA.

39. The item of claim 36, comprising a medium storing instructions that, if executed, enable a system to display an image comprised of at least one bar chart, scalar bar chart, bar chart in pie segment format, or at least one image of a power consumption component and associated bar chart, or an image of at least one power consumption component and associated numerical display.

40. The item of claim 36, comprising a medium storing instructions that, if executed, enable a system to display said image varying in time in one or more characteristics to include color, hue, shading, density of cross hatching, contrast, content, shape, orientation, pattern, illumination and/or highlighting.

41. A data collection and display system for a proper vehicle comprising:
- a first CPU controlling engagement forces of one or more of the wheels;
- at least one sensing means producing an electrical input signal proportional to said engagement forces and providing said signal to a second CPU;
- at least one display signal generated by said second CPU derived from said input signal, said display signal proportional to said engagement forces; and
- at least one display device;
- whereby said at least one display signal is transferred from said second CPU to said display device, said display device displaying an image proportional to said engagement forces to the operator.

42. A data collection and display system as in claim 41 wherein, said image is comprised of a display varying in time in one or more characteristics to include color, hue, shading, density of cross hatching, contrast, content, shape, orientation, pattern, illumination and/or highlighting.

43. A data collection and display system as in claim 41, wherein said at least one display means is an LED, LCD, vacuum fluorescent means, GPS display and/or trip computer, numerical display, gauge, meter and/or PDA.

44. A data collection and display system as in claim 41, wherein said first CPU and said second CPU are the same CPU.

* * * * *